(12) United States Patent
Huang

(10) Patent No.: US 7,131,692 B2
(45) Date of Patent: Nov. 7, 2006

(54) DETACHABLE CHILDREN VEHICLE SEAT

(75) Inventor: Pao Shan Huang, Chiai Hsien (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 11/298,693

(22) Filed: Dec. 12, 2005

(65) Prior Publication Data

US 2006/0138823 A1 Jun. 29, 2006

(30) Foreign Application Priority Data

Dec. 13, 2004 (TW) .............................. 93220043 U

(51) Int. Cl.
*B60N 2/26* (2006.01)
(52) U.S. Cl. ................................... 297/250.1
(58) Field of Classification Search ............ 297/250.1, 297/255, 256, 440.1, 440.13, 440.15, 440.16, 297/354.13, 256.1, 256.13
See application file for complete search history.

(56) References Cited

U.S. PATENT DOCUMENTS

| 5,310,242 A * | 5/1994 | Golder ......................... 297/14 |
| 5,498,065 A * | 3/1996 | Tosoni .................... 297/440.21 |
| 5,845,968 A * | 12/1998 | Lovie ....................... 297/256.1 |
| 5,964,502 A * | 10/1999 | Stephens .................. 297/250.1 |
| 6,033,019 A * | 3/2000 | Hession-Kunz et al. . 297/250.1 |
| 6,908,151 B1 * | 6/2005 | Meeker et al. ........... 297/250.1 |
| 2003/0151282 A1 * | 8/2003 | Williams et al. ......... 297/250.1 |
| 2004/0061366 A1 * | 4/2004 | Meeker et al. ........... 297/250.1 |

* cited by examiner

*Primary Examiner*—Milton Nelson, Jr.
(74) *Attorney, Agent, or Firm*—Birch, Stewart, Kolasch & Birch, LLP

(57) ABSTRACT

A detachable vehicle seat for children having a base and a backrest pivotally connected together by a connection mechanism. The connection mechanism includes a transverse latching bar and a restriction tab in the back of the seat. A cross-section of the latching bar has a short edge and a long edge, and the restriction tab has vertical receiving slots and apertures of differing heights. During assembly, the short edge of the latching bar is inserted into said apertures and restricted by its long edge from moving backwards, thereby preventing the bar from coming off of the receiving slots, thereby simplifying assembly or disassembly of the seat.

7 Claims, 7 Drawing Sheets

DETACHABLE CHILDREN VEHICLE SEAT

BACKGROUND OF THE INVENTION

1. Field of the Invention

This invention relates to a detachable vehicle seat for children and, in particular, to a detachable assembly which makes use of a transverse latching bar and a restriction tab interlocked between the base and backrest.

2. Description of the Background Art

An increased number of people carry their baby or children in vehicles, since the economy is boosting. However, the seat belts equipped in a car are intended for use by adults and might be fatal if used for a baby or child. Therefore, in consideration of the safety of children, people must use a vehicle seat for children together with the seat belt, the use of which is regulated by many countries in the world.

The simplified vehicle seat for children sold on the market can usually be separated into a base and a backrest, to reduce the size of the seat during transportation, and can then be assembled, if necessary for use. FIGS. 1 and 1A show a prior art detachable vehicle seat for children which includes a backrest 1 and a base 2, wherein the backrest 1 has a lateral view of an N-shaped sealed positioning bar 11 extending from the bottom of the backrest. Positioning blocks 21 extend from the back side of the base 2 and are arranged symmetrically with an upward and downward crossed position. The method and procedure for detachment of this seat is 1) to turn over the backrest 1 downwards and lay it down (as illustrated in FIGS. 1B and 1C), 2) to move the backrest parallel to the base to disengage the positioning bar 11 from the outermost positioning block 21 (as illustrated in FIG. 1D), and 3) to tilt and turn over the backrest 1 to disengage the positioning bar 11 from the other positioning blocks 21 (as illustrated in FIG. 1E). This procedure can be reversed to assemble the vehicle seat.

It is clear from the above description and illustration that the assembly procedure of the prior art is complicated and may not be practical, since the user has to turn the backrest or the base over repeatedly is while assembling or dismantling the safety seat, which is inconvenient.

SUMMARY OF THE INVENTION

Hence, the present invention overcomes the problem associated with assembly structure between the base and the backrest of the child's safety seat shown in the prior art, and eliminates the inconvenience of repeatedly turning over the seat while disengaging or assembling the backrest and the seat. The main idea of this invention is to set a transverse latching bar in the bottom of the backrest, wherein the bar has a long and a short edge as seen in a cross-sectional view. The backrest and the base are parallel when the latching bar is inserted into the back side of the base by its short edge, and is received by receiving slots and apertures formed on the restriction tab. The seat is able to accommodate a child when the base and the backrest are angled by rotating the backrest. Since the receiving slots have a higher vertical height relative to said apertures, the long edge of the latching bar is prevented from coming off of the receiving slots so as to connect the base and the backrest. This invention therefore simplifies assembly and disassembly of the vehicle seat via an easy procedure.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
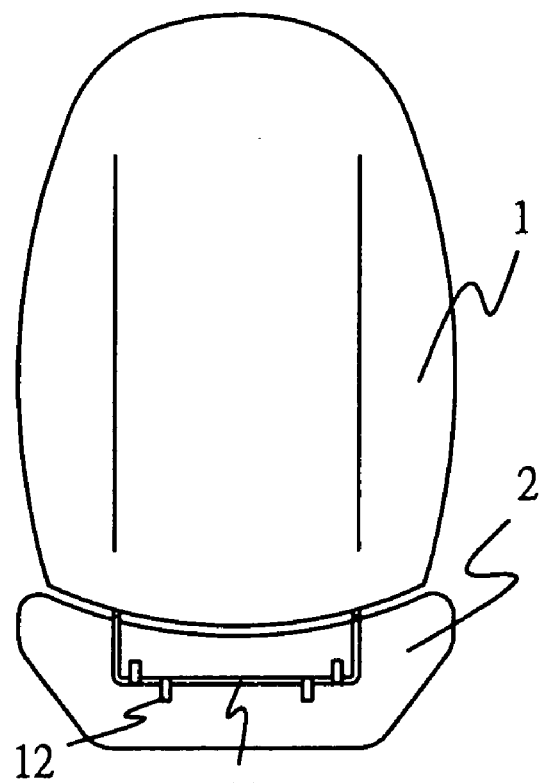
FIG. 1 is a rear elevational view of a prior art vehicle seat for children.
Figure 1A:
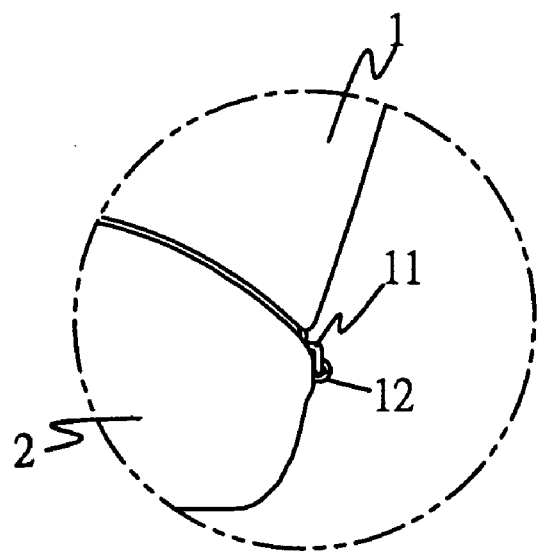
FIG. 1A is an enlarged side sectional view of the seat of FIG. 1.
Figure 1B:
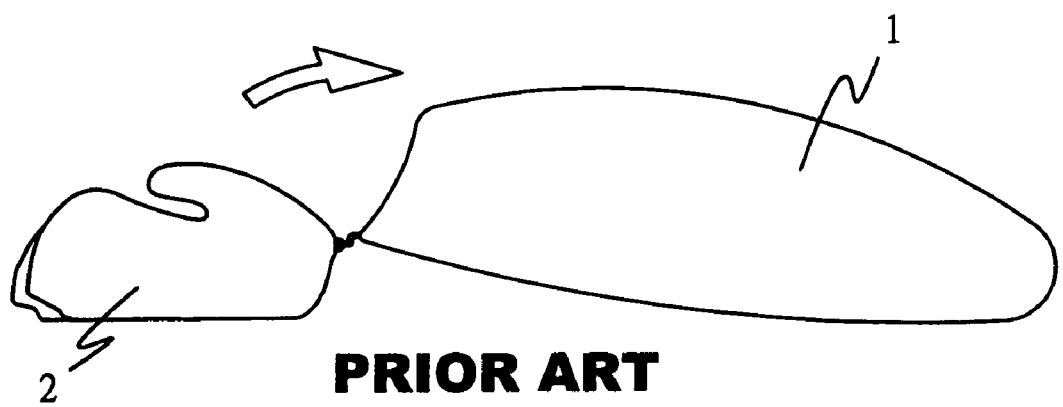
FIG. 1B is a first schematic view of the seat detachment of FIG. 1.
Figure 1C:
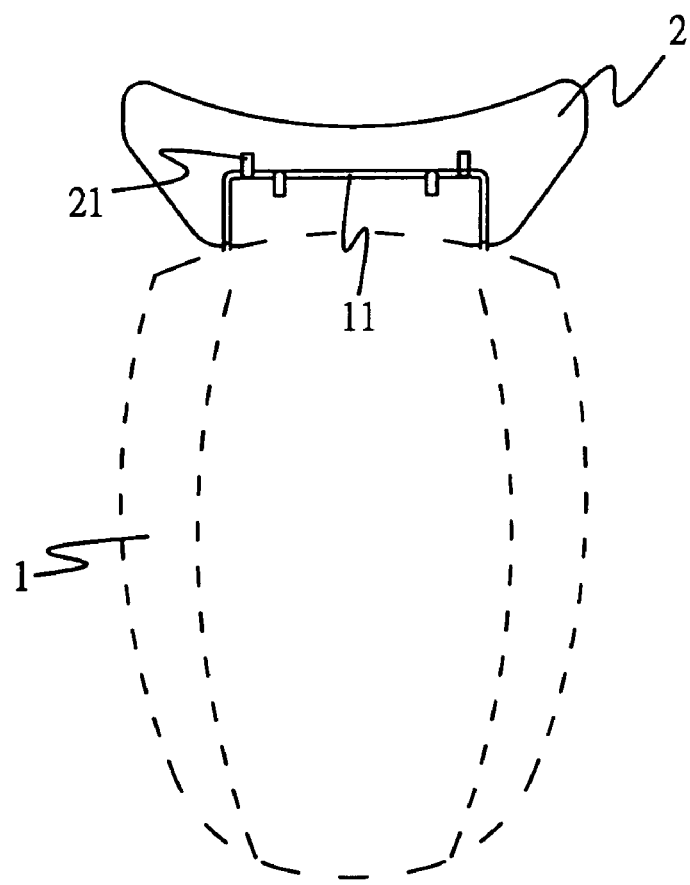
FIG. 1C is a second schematic view of the seat detachment of FIG. 1.
Figure 1E:
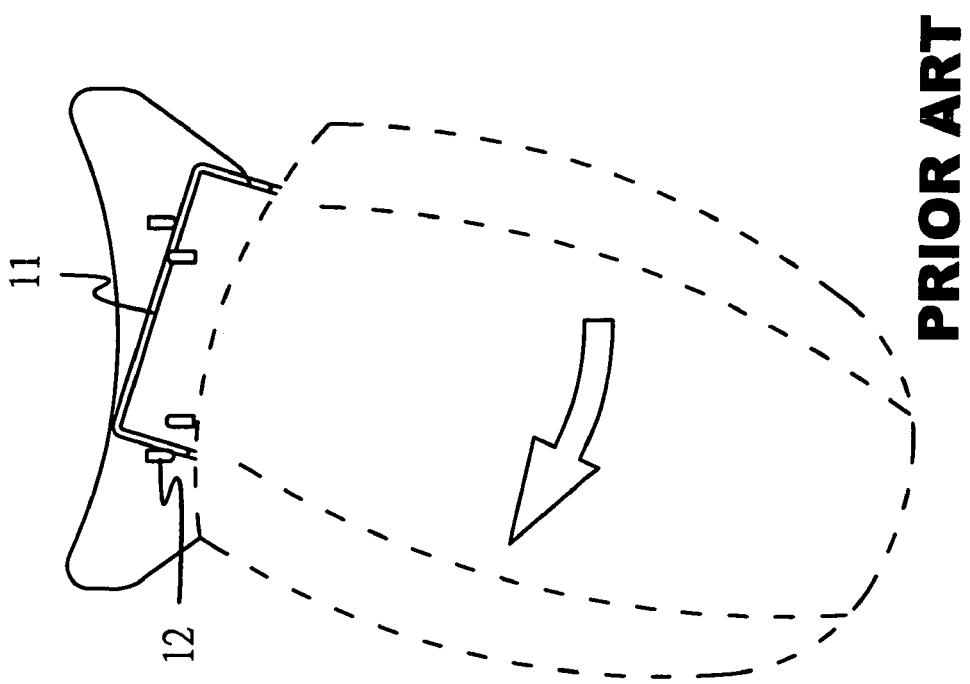
FIG. 1E is a fourth schematic view of the seat detachment of FIG. 1
Figure 1D:
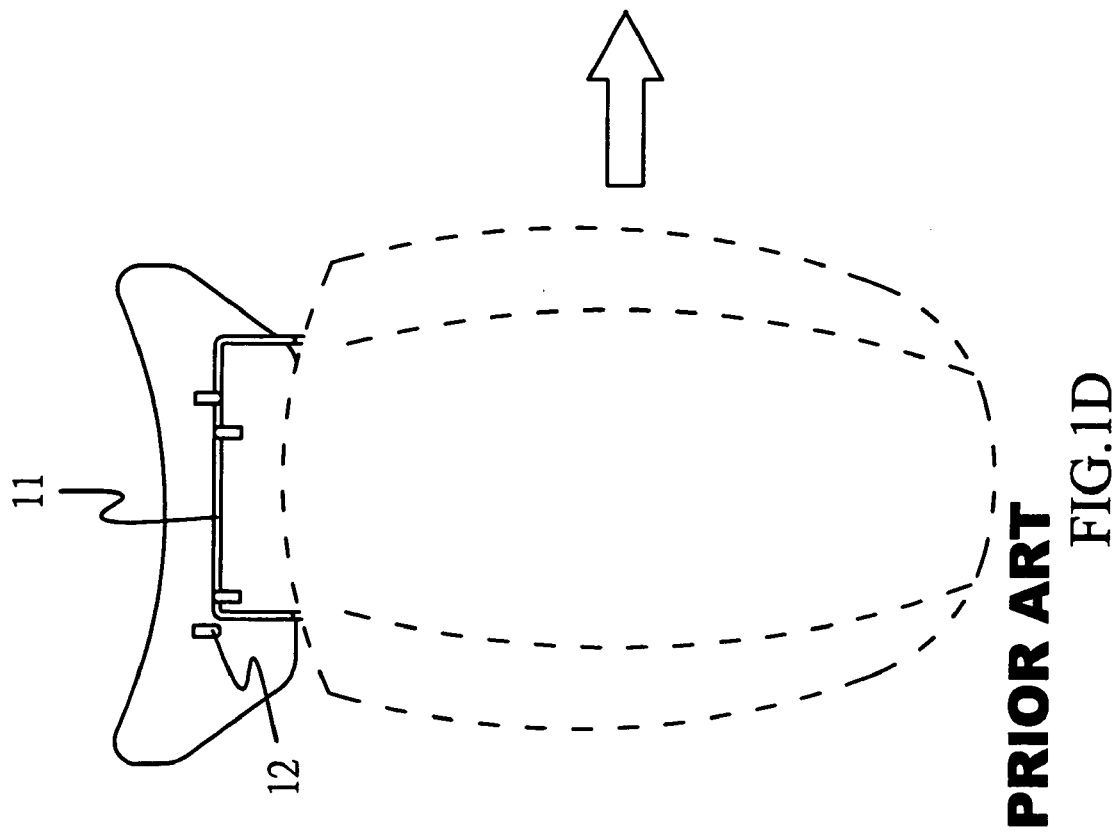
FIG. 1D is a third schematic view of the seat detachment of FIG. 1
Figure 2:
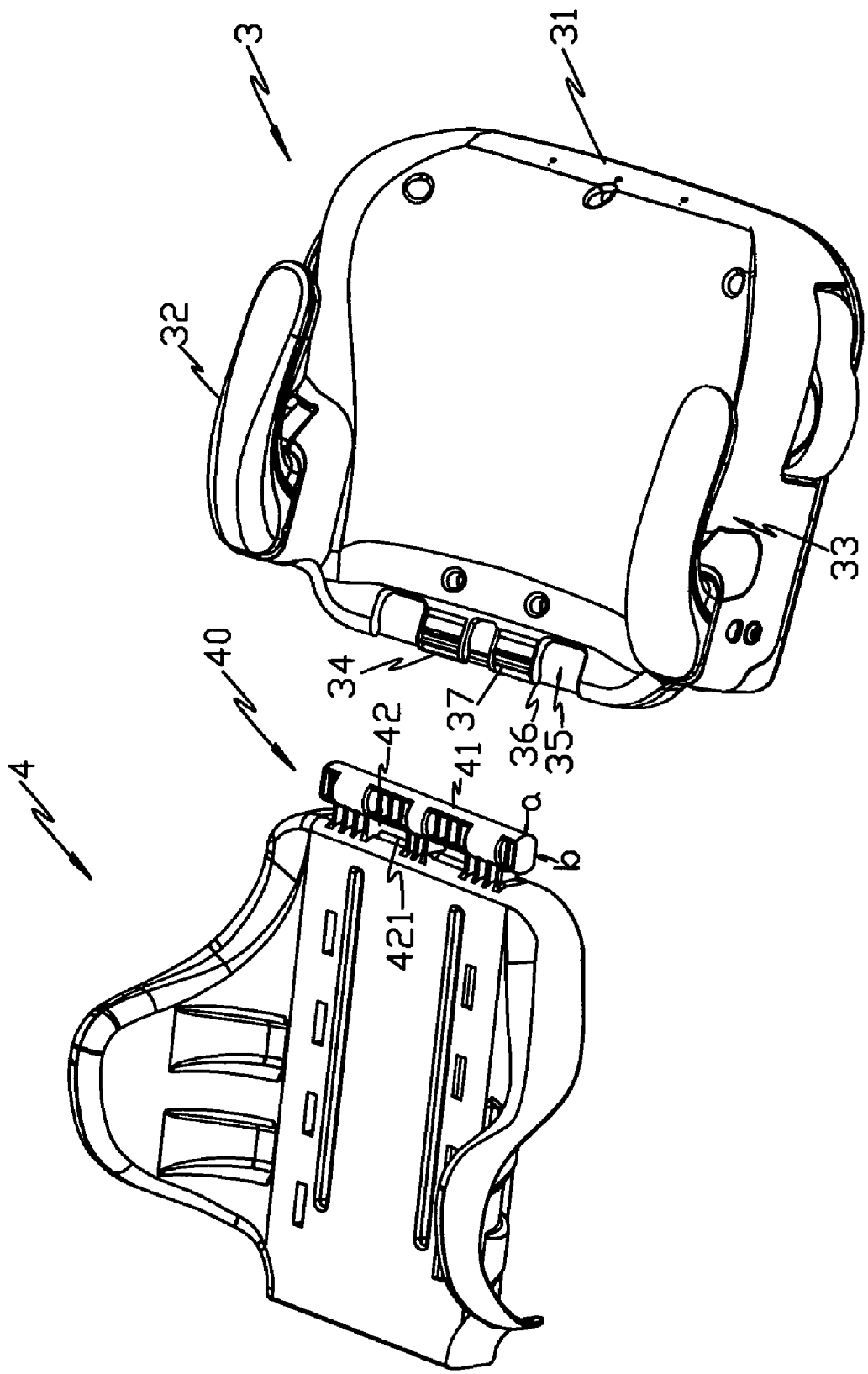
FIG. 2 is a perspective view of a detachable vehicle seat for children showing a preferred embodiment of disassembly in accordance with the present invention.
Figure 3:
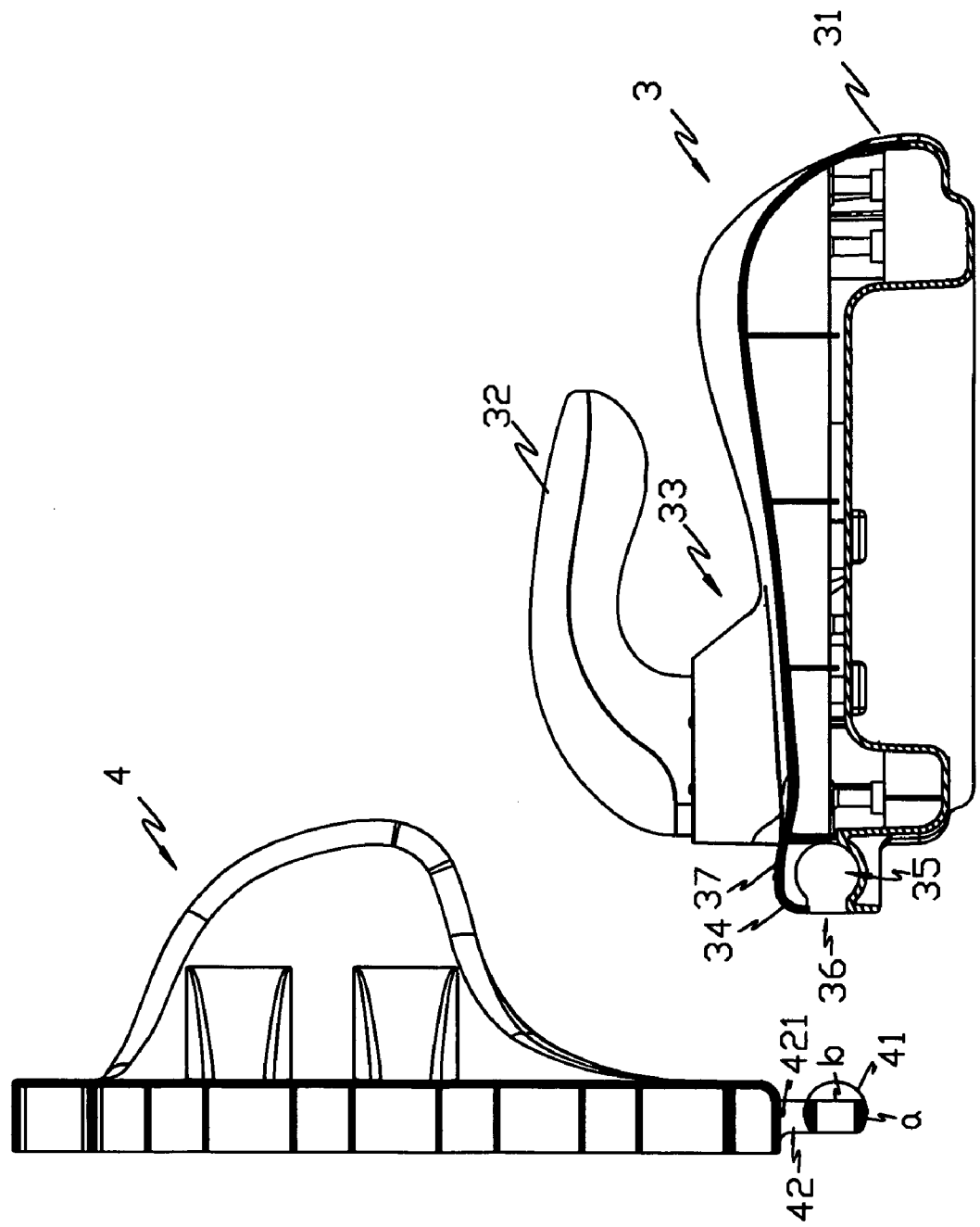
FIG. 3 is a cross sectional view of the detachable vehicle seat for children showing a preferred embodiment of disassembly in accordance with the present invention.

FIGS. 2 and 3 illustrate a connection mechanism of a vehicle seat for children which provides a user with an easy manner of assembly, and convenience of storage and transportation in accordance with the present invention. The preferred embodiment of this invention includes a base 3 and a backrest 4.

The base 3 includes a seat portion 31. Both sides of said seat portion 31 are connected to a pair of side armrests 32. A location 33 is provided though which a vehicle safety belt may be passed, which is formed between said seat portion 31 and the armrests 32, thereby enabling the vehicle seat for children to be fastened by a safety belt when placed on a seat of a car. An arc restriction tab 34 is extended from an integral interval of the rear side of said seat portion 31, wherein the apertures 35 form a circular shape, and the transverse apertures 35 and receiving slots 36 are formed between the restriction tab 34 and the seat portion 31. The vertical height of the receiving slots 36 is smaller than that of the receiving slots 35. One or more location portions 37 extends upwardly from the restriction tab 34, said location portions 37 being an integrally formed projection or groove.

The backrest 4 is pivotally connected with the base 3, said backrest 4 having an integral connected portion 40 at its end. Portion 40 includes a transverse latching bar 41 and several positioning slots 42, with the number of positioning slots being equal to the number of restriction tabs 34 of the base 3. The restriction tabs are received by the positioning slots 42, said slots having a block 421 interlocked with the located portion 37. A cross-section of said latching bar 41 has two edges, short (a) and long (b), wherein said short edge (a) has a vertical height smaller than that of said receiving slots 36, and wherein the long edge (b) is a little bit smaller than said apertures 35 but bigger than said receiving slots 36.

Figure 4:
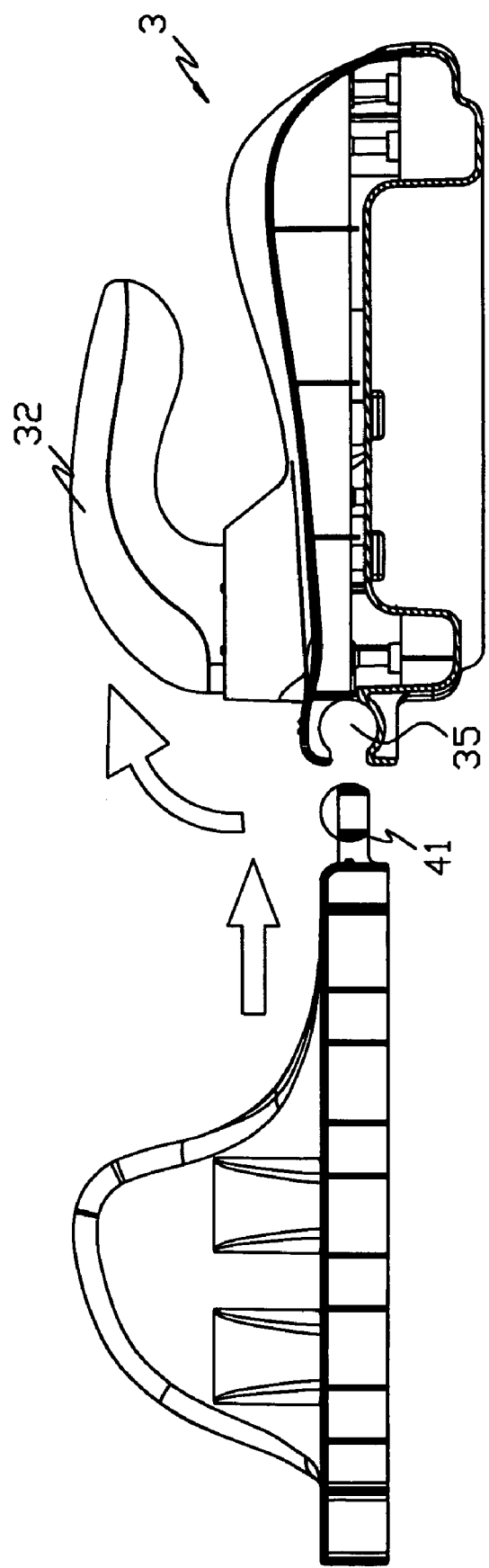
FIG. 4 is a schematic view of the detachable vehicle seat for children showing a preferred embodiment of the motion of assembly in accordance with the present invention.
Figure 5:
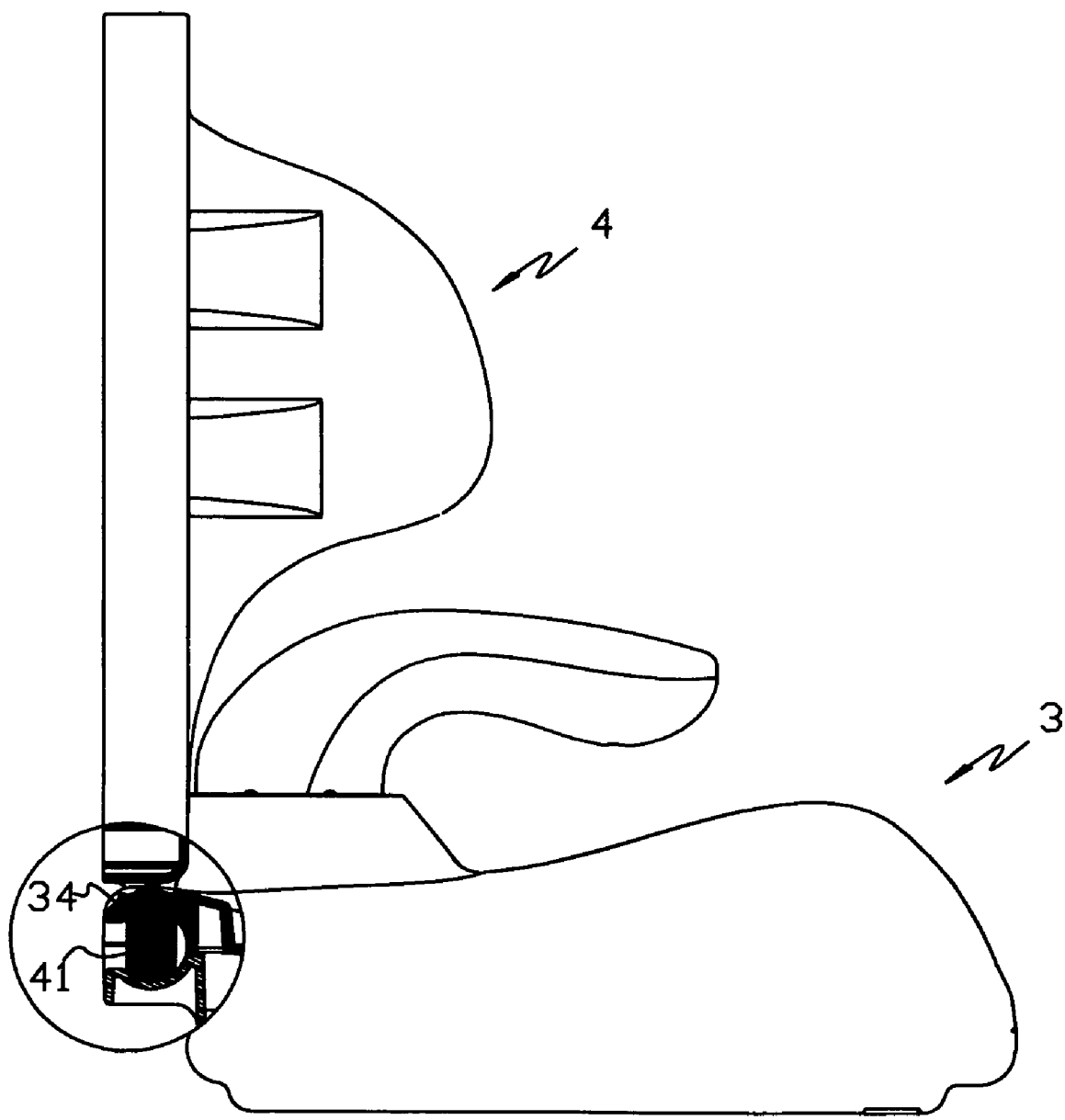
FIG. 5 is a partial cross-sectional view of the detachable vehicle seat for children showing a preferred embodiment of completed assembly in accordance with the present invention.

Referring to FIGS. 4 and 5, since the short edge (a) of latching bar 41 of the backrest 4 is a little bit smaller than the apertures 36, the backrest 4 is laid down when connecting the base 3 and the backrest. The short edge (a) of latching bar 41 is placed facing toward the receiving slots 36 and allows the latching bar 41 to be inserted into the aperture 35 through the receiving slots 36 The user then rotates the backrest 4 upward, and the restriction tab 34 of the base 3 is received by the positioning slots 42 of the backrest 4. Therefore, an angle for accommodating children is formed between the base 3 and the backrest 4 by the block 421 of the positioning slots 42 together with the location portion 37 of the restriction tab 34. Meanwhile, the latching bar 41 is prevented from coming off the receiving slots 36, since the vertical height of long edge (b) is bigger than the vertical height of the receiving slots 36 when the back 4 is rotated and the long edge (b) of the latching bar 41 is turned toward the receiving slots 36. The preferred embodiment of connecting the base 3 and the backrest 4 is illustrated in FIG. 5. When separating the base 3 and the backrest 4, the backrest 4 is rotated and laid down, so that the short edge (a) is placed facing toward the receiving slots 36. The user then removes the backrest 4, thereby disengage the latching bar 41 of the backrest 4 from the receiving slots 36. As discussed above, the connection mechanism of the present invention provides simplified assembly or disassembly of the base 3 and the backrest 4, which a user can operate in a simple way.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A detachable vehicle seat for children, comprising:
    a base having a seat portion and a restriction tab, said tab extending from a rear end of the seat portion and having a transverse aperture and a receiving slot, wherein a vertical height of said receiving slot is smaller than a vertical height of said aperture; and
    a backrest having a connected portion at one end, wherein said connected portion includes a positioning slot and a transverse latching bar with a short edge and a long edge, wherein the short edge of the latching bar is inserted into the receiving slot, and the restriction tab is received by the positioning slot, wherein, upon pivoting the backrest upwards, an angle is formed between the base and the backrest, thereby blocking the long edge of the latching bar from coming off of the receiving slot.

2. The detachable vehicle seat for children of claim 1, wherein the restriction tab has a location portion which is interlocked with a block of the positioning slot of the backrest, thereby forming a fixed angle between the base and the backrest.

3. The detachable vehicle seat for children of claim 2, wherein said location portion is a projection extending from said restriction tab.

4. The detachable vehicle seat for children of claim 1, wherein said location portion is a groove.

5. The detachable vehicle seat for children of claim 1, wherein said restriction tab has a curved shape.

6. The detachable vehicle seat for children of claim 1, wherein each side of said seat portion is connected to an armrest.

7. The detachable vehicle seat for children of claim 6, wherein a location is formed between the seat portion and the armrests through which a vehicle safety belt can be passed.

\* \* \* \* \*